JOHN MURPHY.

Improvement in Billiard-Cushions of Rubber and Gutta-Percha.

No. 4,912. Reissued May 21, 1872.

Witnesses.
Albert H Hook
[illegible]

Inventor
John Murphy

UNITED STATES PATENT OFFICE.

JOHN MURPHY, OF NEW YORK, N. Y.

IMPROVEMENT IN BILLIARD-CUSHIONS OF RUBBER AND GUTTA-PERCHA.

Specification forming part of Letters Patent No. 119,391, dated September 26, 1871; reissue No. 4,912, dated May 21, 1872.

*To all whom it may concern:*

Figure 1:
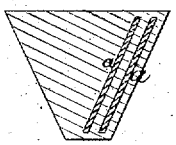

Be it known that I, JOHN MURPHY, of the city, county, and State of New York, have invented an Improved Billiard-Cushion, of which the following is a specification:

All billiard-cushions are now made of India-rubber strips of a triangular sectional shape, as shown in the drawing. It has been found, however, that such strips, when made of rubber only, are too elastic, and allow the ball, in striking the exposed edge of the cushion-strips, to bury itself too deep in the rubber. To avoid this difficulty and render the said cushion more repelling various plans have been resorted to —such, for instance, as shown in Figure 1 of the annexed drawing, where there are two strips of cloth inserted, running along the whole length of the cushion-strips near the surface of the inner side, which presents itself to the balls, the strips of cloth being marked *a a* in the said Fig. 1; but, as there is no elasticity in the threads of the cloth so inserted, it is liable to break by the action of the balls striking the edge of the cushion. Furthermore, the cloth, being in contact with vulcanized rubber, must soon decay.

Figure 2:
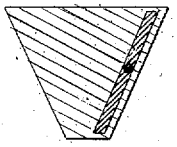
Figure 3:
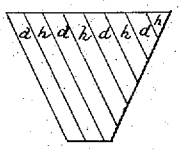

It has also been proposed to make billiard-cushions of alternate layers of rubber and gutta-percha, as shown in Fig. 3, in which *d d* represent the rubber layers and *h h* the gutta-percha layers; but it is a well-known fact that gutta-percha, when exposed to the action of the atmospheric air, will oxidize and decay, although none but the edges may be exposed. It must be admitted, however, that a gutta-percha layer used for facing the rubber cushions, when properly placed and protected against the air, would make the best cushion, as the gutta-percha possesses strength combined with a limited amount of elasticity to be proof against breakage; and, by long experience, I find that my improved cushion, as shown in Fig. 2, surpasses all other devices. It has the requisite amount of quick-repelling power, and is not liable to decay. It consists of a rubber back faced with a strip of gutta-percha, marked *b* in Fig. 2, and this gutta-percha strip is protected from the air by a thin cover of India rubber, the whole cushion being vulcanized in a mold.

I do not claim a billiard-cushion composed of rubber and gutta-percha; but

I claim—

A billiard-cushion consisting of a rubber back faced with gutta-percha, which gutta-percha is protected by a rubber covering, substantially as and for the purpose specified.

JOHN MURPHY.

Witnesses:

JUNIUS SCHENCK,

ALBERT H. HOOK.